(12) United States Patent
Blackman et al.

(10) Patent No.: US 11,441,659 B2
(45) Date of Patent: Sep. 13, 2022

(54) DIFFERENTIAL AND THRUST WASHER THEREFOR

(71) Applicant: TIGERCAT INDUSTRIES INC., Brantford (CA)

(72) Inventors: Benjamin Blackman, Brantford (CA); Shawn Thomas Pette, Brantford (CA); Peter Hoskin, Brantford (CA)

(*) Notice: Subject to any disclaimer, the term of this patent is extended or adjusted under 35 U.S.C. 154(b) by 0 days.

(21) Appl. No.: 17/381,697

(22) Filed: Jul. 21, 2021

(65) Prior Publication Data

US 2021/0348678 A1     Nov. 11, 2021

Related U.S. Application Data

(63) Continuation of application No. PCT/CA2020/050068, filed on Jan. 21, 2020.

(60) Provisional application No. 62/794,895, filed on Jan. 21, 2019.

(51) Int. Cl.
*F16H 48/38*  (2012.01)
*F16C 17/04*  (2006.01)
*F16H 48/08*  (2006.01)

(52) U.S. Cl.
CPC ............ *F16H 48/38* (2013.01); *F16C 17/04* (2013.01); *F16H 48/08* (2013.01); *F16C 2361/61* (2013.01); *F16H 2048/387* (2013.01)

(58) Field of Classification Search
CPC .... F16H 48/38; F16H 48/08; F16H 2048/387; F16C 17/04; F16C 2361/61
See application file for complete search history.

(56) References Cited

U.S. PATENT DOCUMENTS

| | | | | |
|---|---|---|---|---|
| 3,364,791 A * | 1/1968 | Truckle | ................... | F16H 48/08 475/235 |
| 3,580,108 A * | 5/1971 | Mieras | ..................... | F16H 48/22 475/240 |
| 4,084,450 A * | 4/1978 | Conroy | ................... | F16H 48/08 475/160 |
| 4,163,400 A * | 8/1979 | Fisher | ..................... | F16H 48/08 475/230 |
| 8,167,761 B2 * | 5/2012 | Di Micco | ............... | F16H 57/12 475/230 |

FOREIGN PATENT DOCUMENTS

| | | | | |
|---|---|---|---|---|
| DE | 10014875 A1 * | 9/2001 | ............ | B29C 45/14 |
| DE | 102014221408 A1 * | 4/2016 | ............ | F16H 48/08 |
| DE | 102017110136 A1 * | 11/2017 | ............ | F16D 23/12 |
| EP | 1233211 A1 * | 8/2002 | ......... | F16H 57/0427 |
| FR | 2944082 A1 * | 10/2010 | ............ | F16H 48/22 |
| FR | 3001270 A3 * | 7/2014 | ............ | F16H 48/38 |

* cited by examiner

*Primary Examiner* — Sherry L Estremsky
(74) *Attorney, Agent, or Firm* — Amarok IP Inc.; Neil W. Henderson

(57) ABSTRACT

A thrust washer and a differential containing a thrust washer. The differential has a housing, a spider and one or more spider gears. The thrust washer includes a body having an annular shape and a width configured to approximately match with a width of the one or more spider gears. The thrust washer is further configured to engage with the spider to prevent or reduce the thrust washer from rotating relative to the housing when the thrust washer is installed in the differential.

17 Claims, 15 Drawing Sheets

DIFFERENTIAL AND THRUST WASHER THEREFOR

RELATED APPLICATIONS

This application is a continuation of PCT Application No. PCT/CA2020/050068, filed Jan. 21, 2020, and claims priority to and the benefit of U.S. Provisional Patent Application 62/794,895, filed Jan. 21, 2019, the entire contents of which are hereby incorporated herein by reference.

TECHNICAL FIELD

This document relates to a differential and a thrust washer therefor, and, in particular, to a thrust washer for use with spider gears in a differential.

BACKGROUND

Many types of vehicles use a differential to control the distribution of drive power to drive wheels and the like. In a typical differential, one or more pinion gears (sometimes called "pinions", "spider gears" or "planetary gears") are connected with a ring/driving gear via a spider and configured to interact with side gears to provide a variable distribution of power to drive wheels. The side gears each drive an axle which supports the drive wheels of the vehicle. The side gears and the spider gears are supported in a housing. In order to protect the housing and the spider gears, the differential will generally also include one or more washers, generally called thrust washers, located between the spider gears and the housing. Conventional thrust washers are designed in various ways.

FIG. 1 illustrates several types of conventional thrust washers. FIG. 1A shows a flat or somewhat concave thrust washer. This type of thrust washer is typically mounted on the spider and can rotate relative to the pinion as well as the housing. In this case, a thrust washer material that has dry lubricating properties (for example: bronze) may be able to spin against the housing without causing a large amount of damage. However, this type of design may result in a failure of the washer or the housing due to contamination and fluid film issues. For example, since the differential motion only occurs for limited periods of time and does not spin sufficiently to build a proper lubricant film, the coefficients of friction can be unpredictable. In addition, small particles in the oil that are larger in diameter than the lubricant film can rapidly increase the coefficient of friction between the gear and washer causing the majority of the sliding to occur between the thrust washer and housing. With the housing being soft, wear can occur quite easily and increases the contamination in the system FIG. 1B is a flat or somewhat concave thrust washer that has a tab/flap or the like which is intended to lock the washer in relation to the housing and thus, prevent rotation of the washer in relation to the housing. In particular, the differential housing is typically made from a softer material (ductile or grey iron) for manufacturability and cost while the spider gear is made from hardened steel and capable of withstanding high sliding without experiencing noticeable wear. Since the housing is softer than the spider gear, the housing is generally not able to withstand the sliding action as well and can often experience wear that can result in a malfunction. The use of locking tabs can lead to stress concentrations and a large increase in friction can cause the tabs to fracture. An increase in friction can be due to contaminates in the oil in the differential, particularly when the contaminates are larger in diameter than the fluid film.

FIG. 1C is a flat or somewhat concave thrust washer having a textured surface. The textured surface runs against the spider gear and is designed to reduce friction against the gear (by providing a lower coefficient of friction). The differential housing which is rougher has a higher coefficient of friction and is intended to help lock the thrust washer against the housing to prevent rotation.

FIG. 1D is a flat or somewhat concave thrust washer having both a textured surface and tabs for locking the washer in relation to the housing. This is intended to incorporate the elements of the thrust washers in FIGS. 1B and 1C together.

Even with thrust washers having locking mechanisms of the type described above there can be an issue with housing or washer wear or failure due to the high forces encountered in the differential during operation. As such, there is a need for an improved differential and thrust washer for use in differentials that provides better protection for the mechanism and a longer life for the differential.

SUMMARY

According to an aspect herein there is provided a thrust washer for a differential having a housing and an assembly of a spider and one or more spider gears, the thrust washer including: a body having an annular shape and a width configured to approximately match with a width of/cover the one or more spider gears and further configured to engage with the spider to prevent or reduce the thrust washer from rotating relative to the housing when the thrust washer is installed in the differential.

In some cases, the spider includes at least one spider arm and the thrust washer includes at least one engagement mechanism having a size and a shape to engage with an outer diameter of the at least one arm to engage the thrust washer with the spider. In some cases, the at least one spider arm includes four arms, the at least one engagement mechanism includes four apertures, and each of the four apertures are positioned and oriented to engage a respective one of the four arms when the thrust washer is installed in the differential.

In some cases, the thrust washer includes a slope along the width configured to conform with an inner diameter of the housing. In some cases, the slope along the width also conforms to a shape of the spider gears.

In some cases, the thrust washer includes a first portion and a second portion, and the first portion and the second portion are configured to assemble around the spider and the spider gears. In some cases, the slope is configured to engage with the housing to reduce separation of the first portion and the second portion. In some cases, the first portion and the second portion are configured to provide a gap between the first portion and the second portion when assembled to allow the flow of debris or the like. In some cases, the thrust washer has a continuous ring shape. In some cases, the thrust washer includes a gap across the width of the thrust washer. In some cases, the thrust washer is a single contiguous body.

According to an aspect herein there is provided a differential including: a housing; a spider and one or more spider gears; at least two side gears positioned and oriented to engage the one or more spider gears within the housing; and a thrust washer positioned between the housing and the one or more spider gears, the thrust washer including: a body having an annular shape and a width configured to approximately cover the one or more spider gears and further configured to engage with the spider to prevent the thrust washer from rotating relative to the housing when the thrust washer is installed in the differential.

In some cases, the spider comprises at least one spider arm and wherein the thrust washer includes at least one engagement mechanism having a size and a shape to engage with an outer diameter of the at least one spider arm to engage the thrust washer with the spider. In some cases, the at least one spider arm includes four arms, the at least one engagement mechanism includes four apertures, and each of the four apertures are positioned and oriented to engage a respective one of the four arms when the thrust washer is installed in the differential.

In some cases, the thrust washer further includes a slope along the width configured to conform with an inner diameter of the housing. In some cases, the slope along the width also conforms to a shape of the spider gears.

In some cases, the thrust washer includes a first portion and a second portion, and the first portion and the second portion are configured to assemble around the spider and the spider gears. In some cases, the slope is configured to engage with the housing to reduce separation of the first portion and the second portion. In some cases, the first portion and the second portion are configured to provide a gap between the first portion and the second portion to allow the flow of debris or the like.

In some cases, the thrust washer has a continuous ring shape. In some cases, the thrust washer includes a gap across the width of the thrust washer. In some cases, the thrust washer is a single contiguous body.

Other aspects and features of the thrust washer will become apparent, to those ordinarily skilled in the art, upon review of the following description of some exemplary embodiments.

The drawings included herewith are for illustrating various examples of articles, methods, and apparatuses of the present specification and are not intended to limit the scope of what is taught in any way.

DETAILED DESCRIPTION

Various systems, apparatuses or methods will be described herein to provide example embodiment(s). No embodiment described below is intended to limit any claimed invention. The claims are not limited to systems, apparatuses or methods having all of the features of any one embodiment or to features common to multiple or all of the embodiments described herein. A claim may include features taken from any embodiment or a selection of embodiments as would be understood by one of skill in the art. The applicants, inventors or owners reserve all rights that they may have in any invention disclosed herein, for example the right to claim such an invention in a continuing application and do not intend to abandon, disclaim or dedicate to the public any such invention by its disclosure in this document.

Figure 1B:
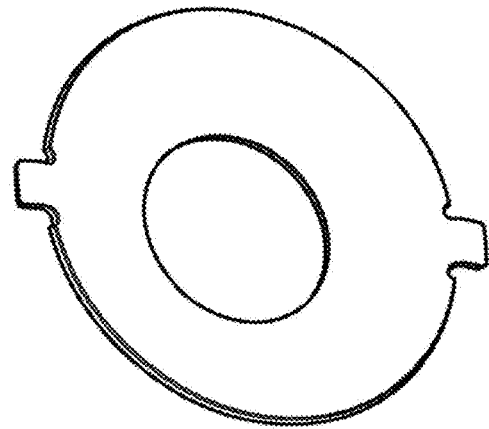
FIGS. 1A-1D show examples of conventional thrust washers.
Figure 1D:
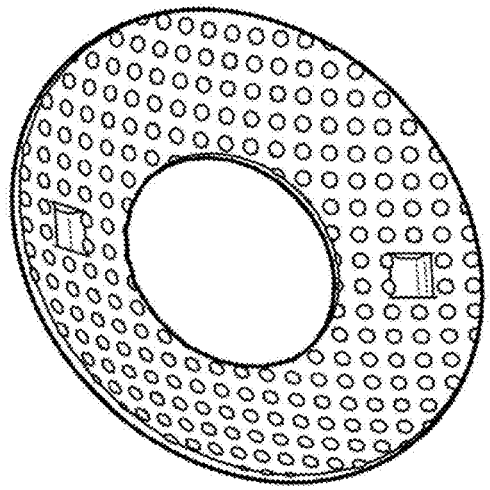
Figure 1A:
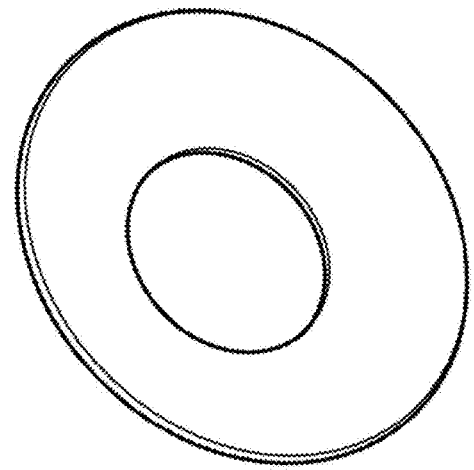
Figure 1C:
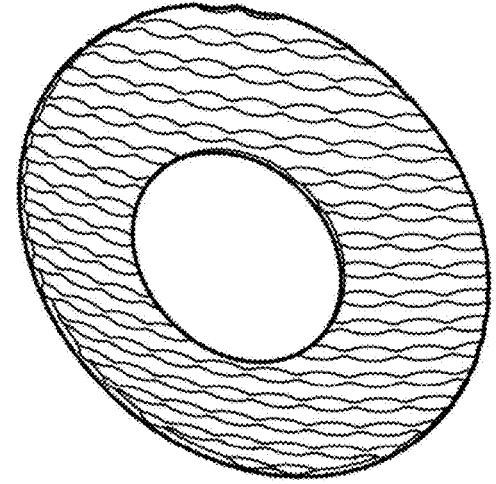
Figure 2:
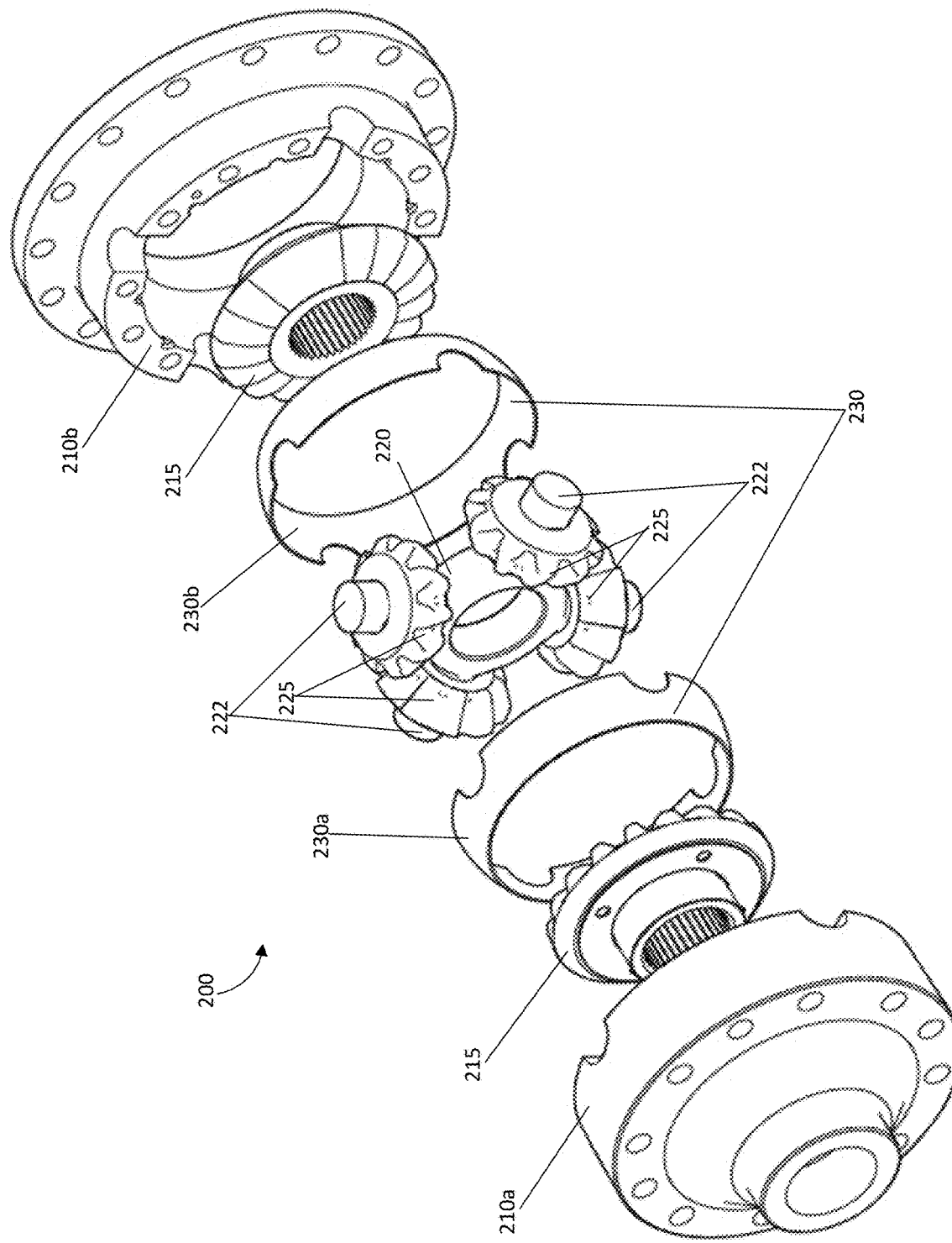
FIG. 2 is a perspective exploded view of a differential according to an embodiment herein.
Figure 3:
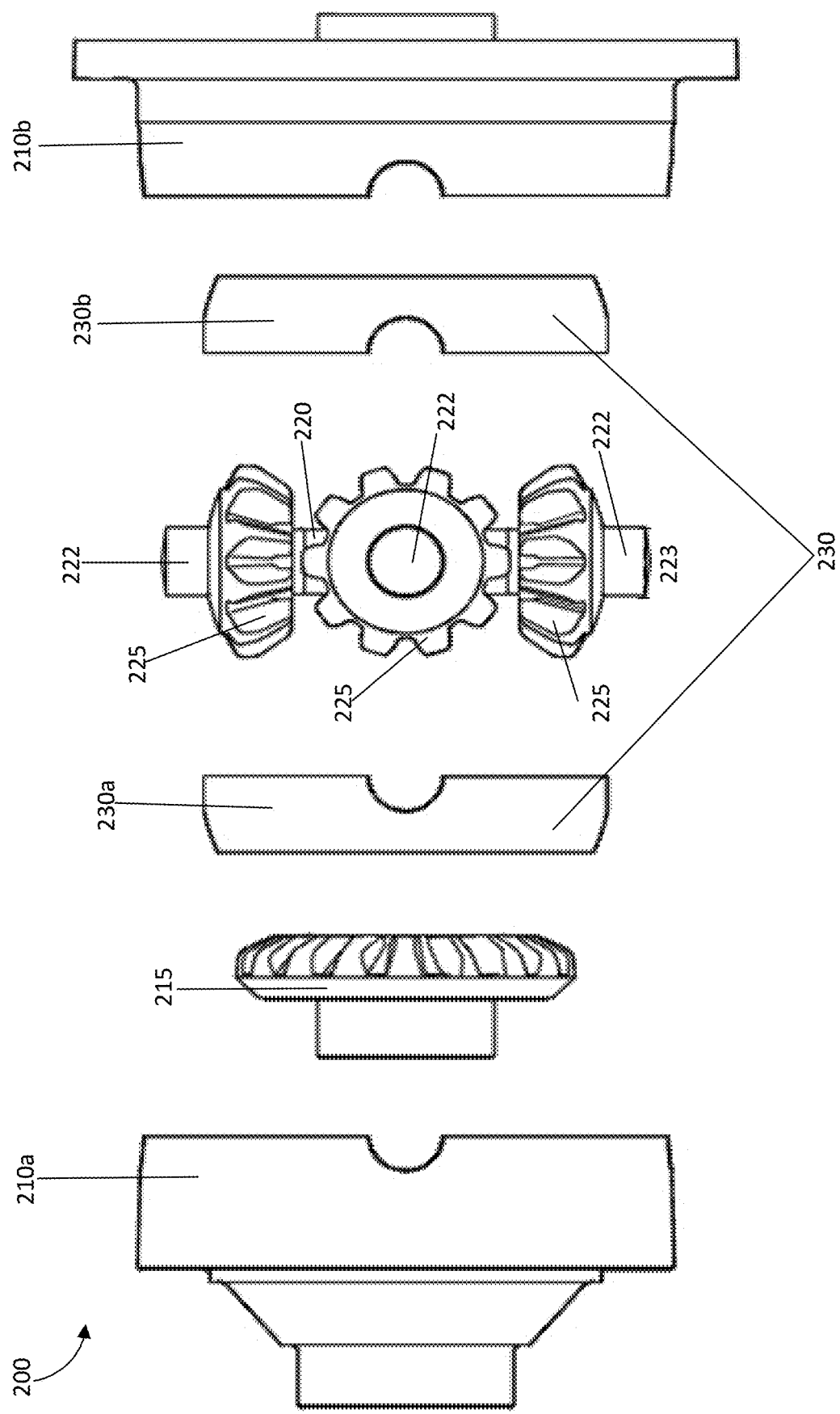
FIG. 3 is a perspective side view of the differential of FIG. 2.

FIG. 2 is a perspective exploded view of a differential 200 according to an embodiment herein. FIG. 3 is a side exploded view of the differential 200 of FIG. 2. The differential 200 includes: a housing 210, two side gears 215, a spider (cross) 220, four spider (pinion) gears 225, and a thrust washer 230. The housing 210 includes first housing portion 210a and second housing portion 210b, which may be combined to form housing 210. The thrust washer 230 includes first thrust washer portion 230a and second thrust washer portion 230b, which may be combined to form thrust washer 230. The spider 220 includes four arms (e.g. stub shafts or posts) 222.

The side gears 215 are supported in the housing 210. The spider gears 225 are each mounted on one of the arms 222 (i.e. stub shafts or posts) of the spider 220. In other words, the spider gears 225 and the spider 220 form a spider gear assembly. The spider 220 is also supported in the housing 210 such that the spider gears 225 mesh with the side gears 215. The thrust washer 230 is provided such that the body of the thrust washer engages with the spider 220 and is located between the spider gears 225 and the housing 210.

Figure 4:
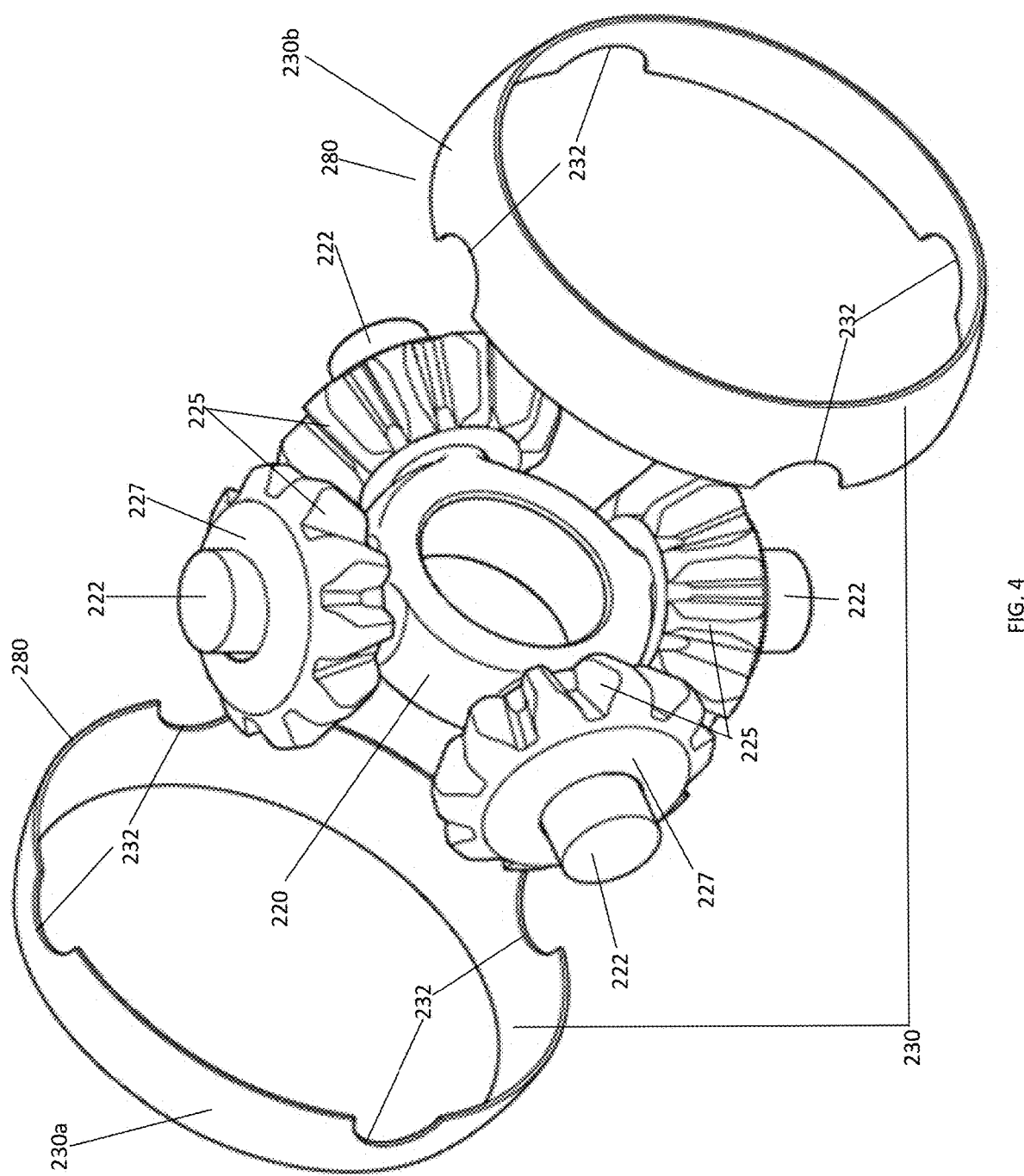
FIG. 4 is a perspective exploded view of a thrust washer according to an embodiment herein, combined with a spider and spider gears.
Figure 5A:
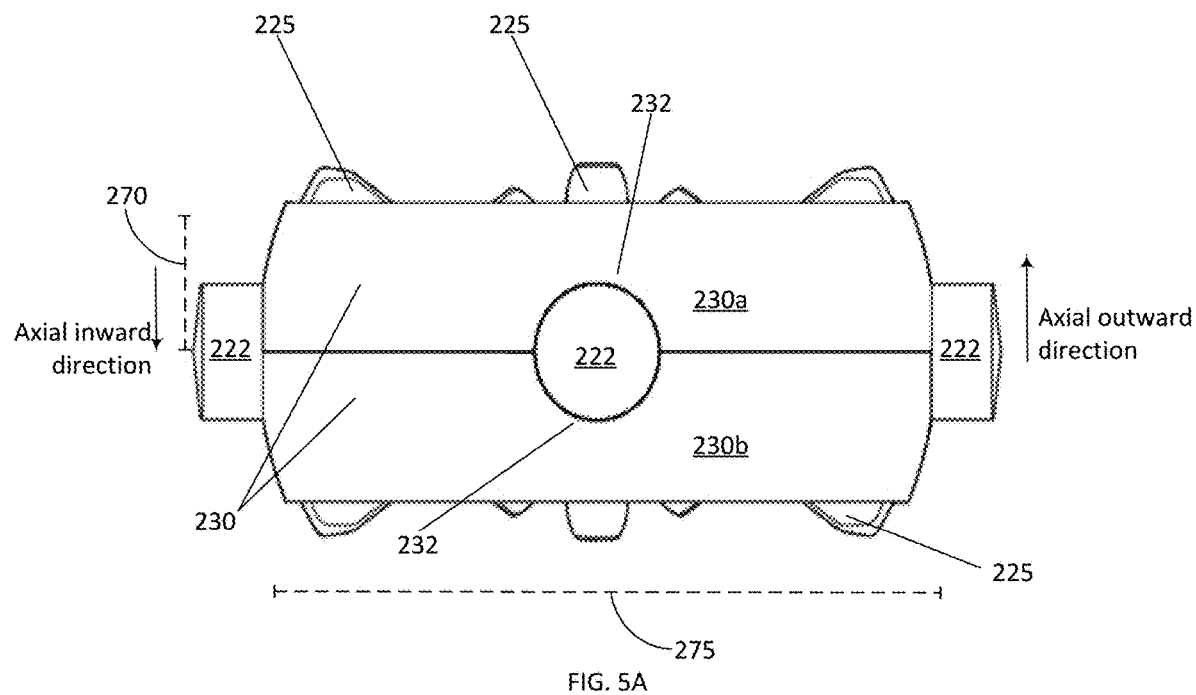
FIG. 5A is a top view of a thrust washer according to an embodiment herein, combined with a spider and spider gears.
Figure 5B:
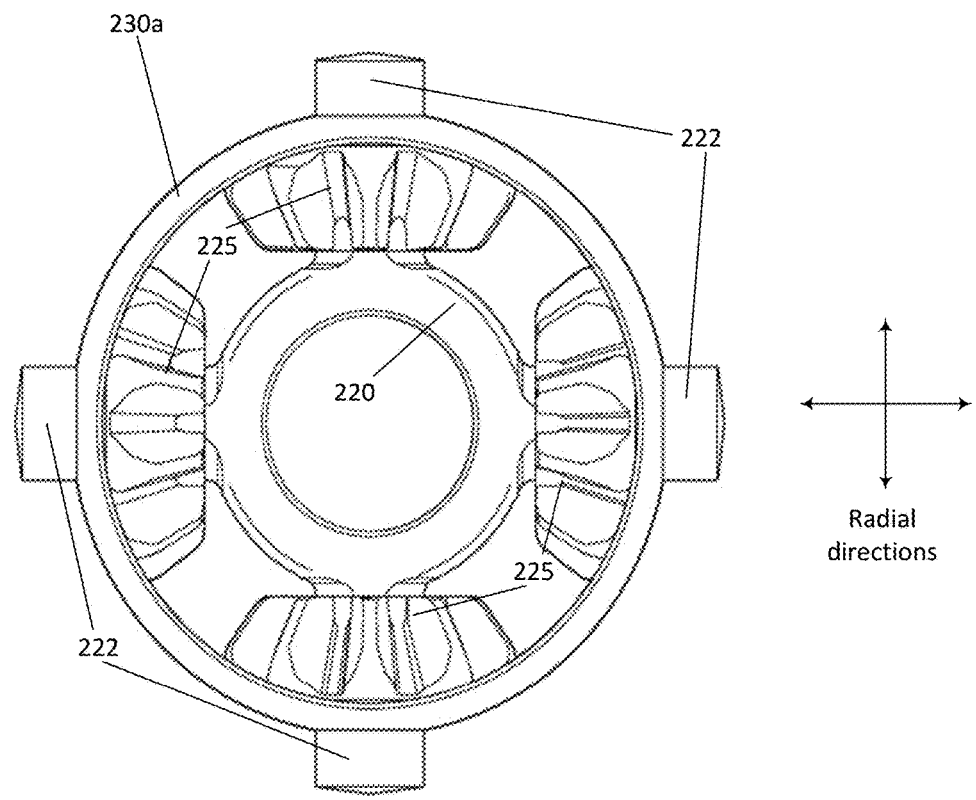
FIG. 5B is a side view of a thrust washer according to an embodiment herein, combined with a spider and spider gears.

FIG. 4 is a perspective exploded view of an embodiment of the thrust washer 230 when paired with the spider 220 and spider gears 225 of the differential 200 of FIG. 2. FIGS. 5A and 5B are top and front views, respectively of the embodiment of the differential 200 of FIG. 4. As shown, the differential 200 includes a thrust washer 230 having a body formed of two halves or portions, a first thrust washer portion 230a and a second thrust washer portion 230b. The first thrust washer portion 230a is generally a mirror image of the second thrust washer portion 230b and has a ring/ annular shape. In particular, in this embodiment, each of first thrust washer portion 230a and second thrust washer portion 230b is a continuous ring/cylinder but this is not required (as described below). In other words, in some embodiments the thrust washer has an annular shape and is also a discontinuous ring/cylinder. Each of first thrust washer portion 230a and second thrust washer portion 230b has a diameter 275 that is configured to be wide enough to enclose all of the spider gears 225 within the thrust washer 230. Each of first thrust washer portion 230a and second thrust washer portion 230b has a width 270 that is configured to be wide enough to match a width of/cover the spider gears 225 and thus separate the spider gears 225 from the housing 210 and thereby protect the housing 210 from the spider gears 225, for example, to prevent or reduce wear on the housing 210 caused by the spider gears 225. In some cases, the thrust washer 230 may have a slope or curvature along its width 270 to conform to the shape of the housing inner diameter (ID) and/or the shape of the spider gears 225.

Each spider gear 225 includes an outer edge (i.e. back face) 227. Some locations of the outer edge 227 of spider gears 225 are denoted in FIG. 4, while additional examples of outer edges 227 have been omitted for clarity. Each of first thrust washer portion 230a and second thrust washer portion 230b includes one or more indentations (e.g. cutouts) 232 positioned on a first edge 280 to allow them to engage with the spider 220 in such a way that the thrust washer covers substantially all of the outer edges 227 of the spider gears 225 when the differential 200 is assembled. The one or more indentations 232 of the first thrust washer portion 230a and the one or more indentations 232 of the second thrust washer portion 230b combine to form one or more engagement mechanisms/connectors/apertures of the thrust washer 230. In other words, the thrust washer 230 includes one or more engagement mechanism/connectors/apertures that connect the thrust washer with the spider. In this case, each aperture is formed by a pair of indentations 232, and each pair of indentations includes one indentation from the first thrust washer portion 230a and one indentation from the second thrust washer portion 230b. In this way, the thrust washer 230 is intended to support substantially all of the outer edges 227 of the spider gear assembly, or at least the portions of the outer edges 227 that could come into contact with the housing 210.

In this embodiment, the thrust washer 230, that is, the first thrust washer portion 230a, and/or the second thrust washer portion 230b, are held/locked in place by engaging an outer diameter (OD) of at least one of the arms 222 of the spider 220 via the indentations 232 (in the present embodiment, the thrust washer 230 engages all four arms 222). Each portion of the thrust washer 230 is controlled from moving axially inward by the interaction with the arms 222, as well as with each other. The engagement of the thrust washer 230 to the arms 222 prevents or reduces rotation of the thrust washer 230 against the housing 210. Since the thrust washer does not rotate against the housing, the surface roughness or strength of the housing 210 should not significantly affect the wear resistance or durability of the housing 210. Further, each of the first thrust washer portion 230a, and/or the second thrust washer portion 230b are prevented from moving radially and/or axially outward by abutting against the ID of the differential housing 210 and due to the annular shape. In operation, the outward force of the spider gears 225 pushes the thrust washer 230 outward against the housing 210, and the housing 210 prevents separation of the portions of the thrust washer 230. Examples of the orientation of axial inward and axial outward movement are depicted in FIG. 5A, in particular axial inward and axial outward movement of the first thrust washer portion 230a when the first thrust washer portion 230a experiences rotational forces in a counter-clockwise direction due to rotation of one of the spider gears 225. Examples of the orientation of radial movement and rotation against the housing are depicted in FIG. 5B.

As noted above, the purpose of a thrust washer is to protect against the thrust and rotary action between the spider gear and the differential housing. The arrangement of the thrust washer 230 of the present embodiment holds/locks the thrust washer 230 to the spider 220 via the indentations 232 (an engagement mechanism) while generally covering the spider gears 225 to provide protection to the housing 210.

Figure 6:
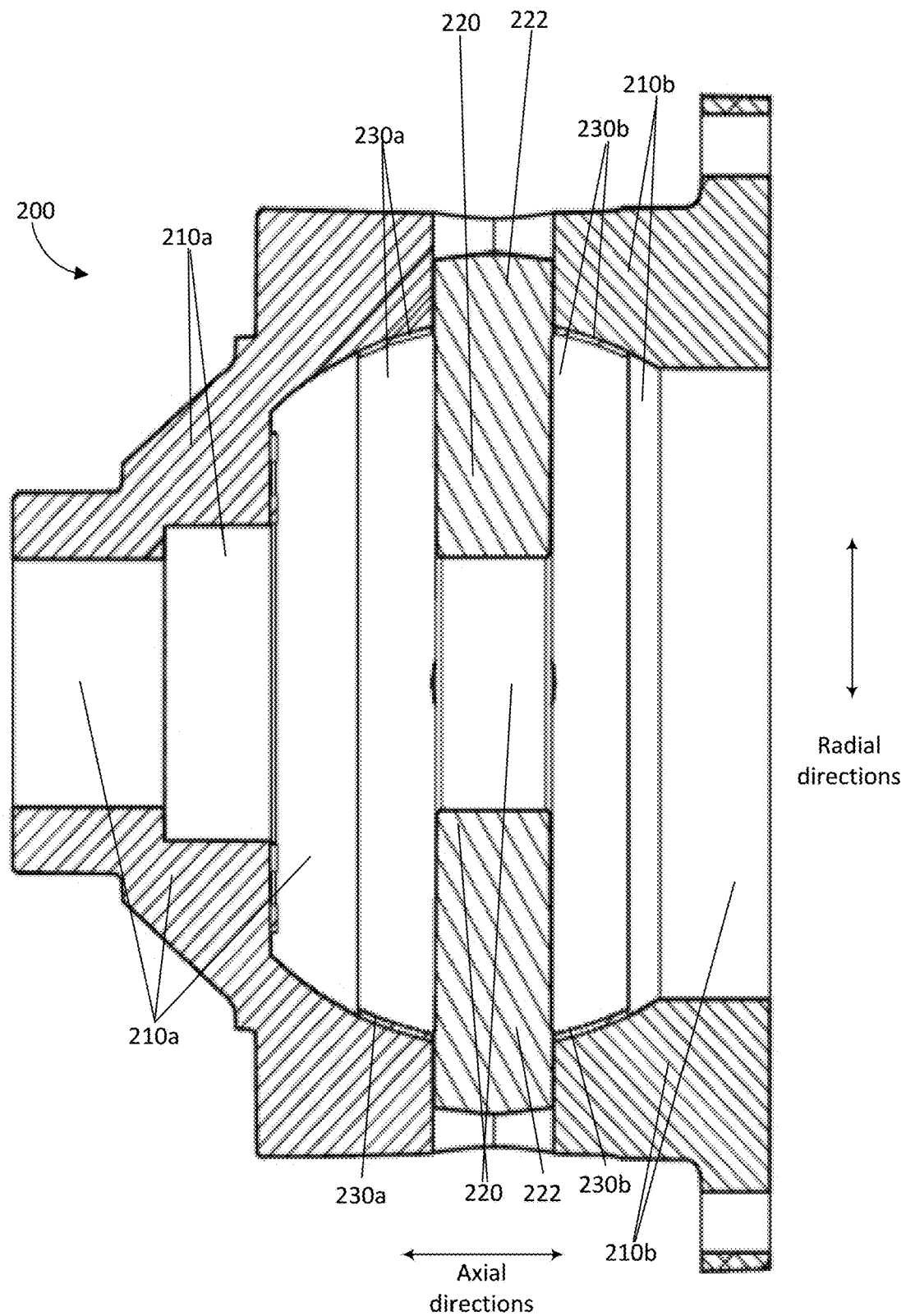
FIG. 6 is a sectional view of the differential of FIG. 2, illustrating the thrust washer of FIG. 4 within the differential housing but with internal gears hidden.

FIG. 6 is a cross-sectional view of the differential 200 of FIG. 2 in which the spider gears and side gears have been removed. FIG. 6 illustrates how the thrust washer 230 is constrained from moving axially outward as well as radially by being placed against the ID of the housing 210. For example, the first thrust washer portion 230a is constrained from moving radially by abutting against the ID of the differential housing 210, axially outward (to the left in FIG. 6) by abutting against the ID of the differential housing 210, and axially inward by abutting against the second thrust washer portion 230b and the arms 222. Likewise, the second thrust washer portion 230b is constrained from moving radially by abutting against the ID of the housing 210, axially outward (to the right in FIG. 6) by abutting against the ID of the housing 210, and axially inward by abutting against the first thrust washer portion 230a and the arms 222.

Figure 7:
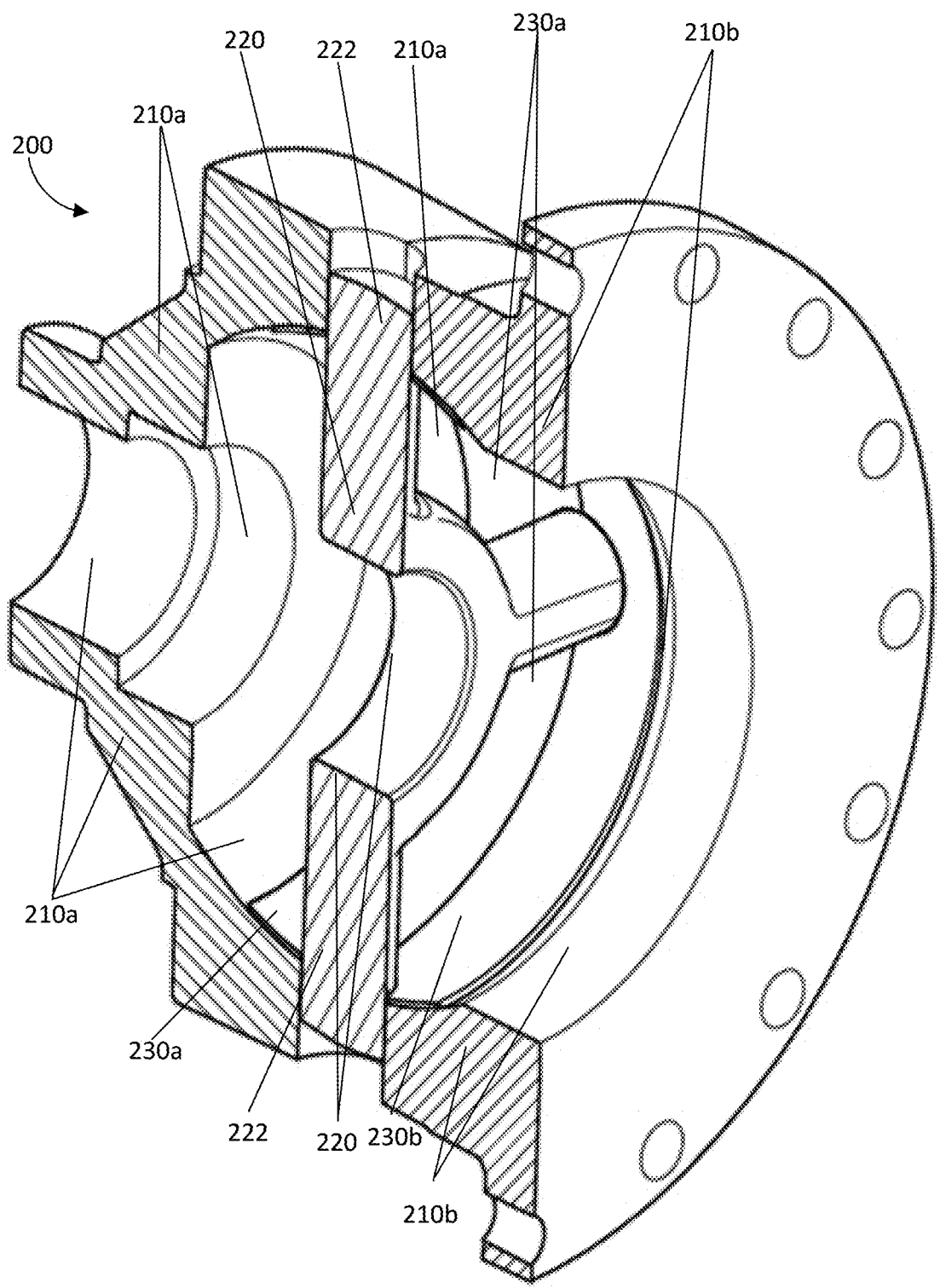
FIG. 7 is a sectional perspective view of FIG. 6.

FIG. 7 is a cross-sectional perspective view of the differential 200 of FIG. 6 in which the spider gears and side gears are hidden. FIG. 7 illustrates the position of the thrust washer 230 in relation to the spider 220 when installed in the housing 210 and is intended to show how the thrust washer 230 interacts with the spider 220 to prevent or reduce rotation of the thrust washer 230 within the housing 210.

Figure 8:
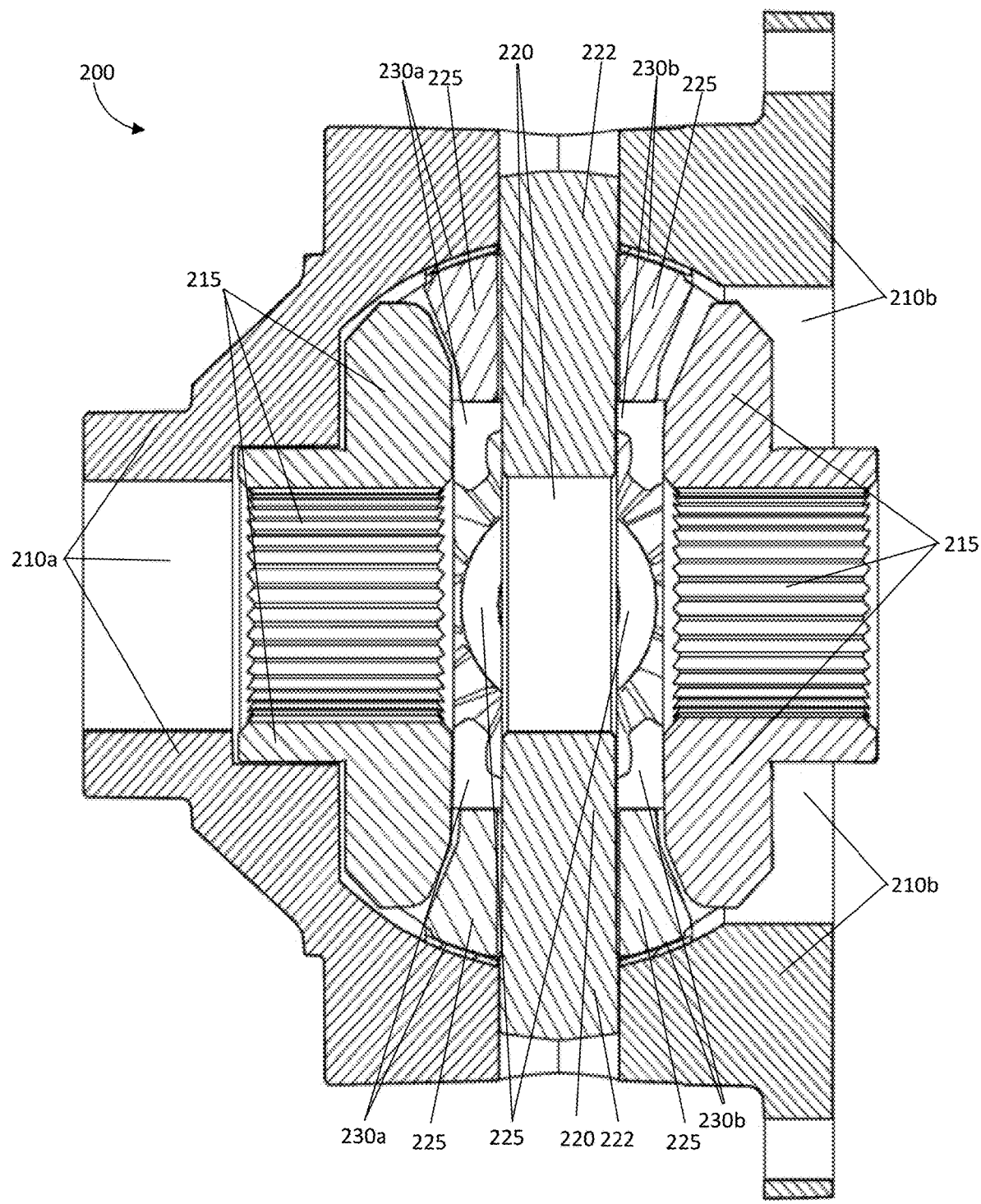
FIG. 8 is a sectional view of the differential of FIG. 2, illustrating the thrust washer of FIG. 4 within the differential housing but with gears shown.

FIG. 8 is a cross-sectional view of the differential 200 of FIG. 6, however the spider gears 225 and side gears 215 are shown in FIG. 8. FIG. 8 illustrates the interaction between the spider gears 225 and the thrust washer 230, in particular the position of the thrust washer 230 relative to the spider gears 225 to at least partially/approximately enclose/cover the spider gears 225 to provide protection to the housing 210.

Figure 9:
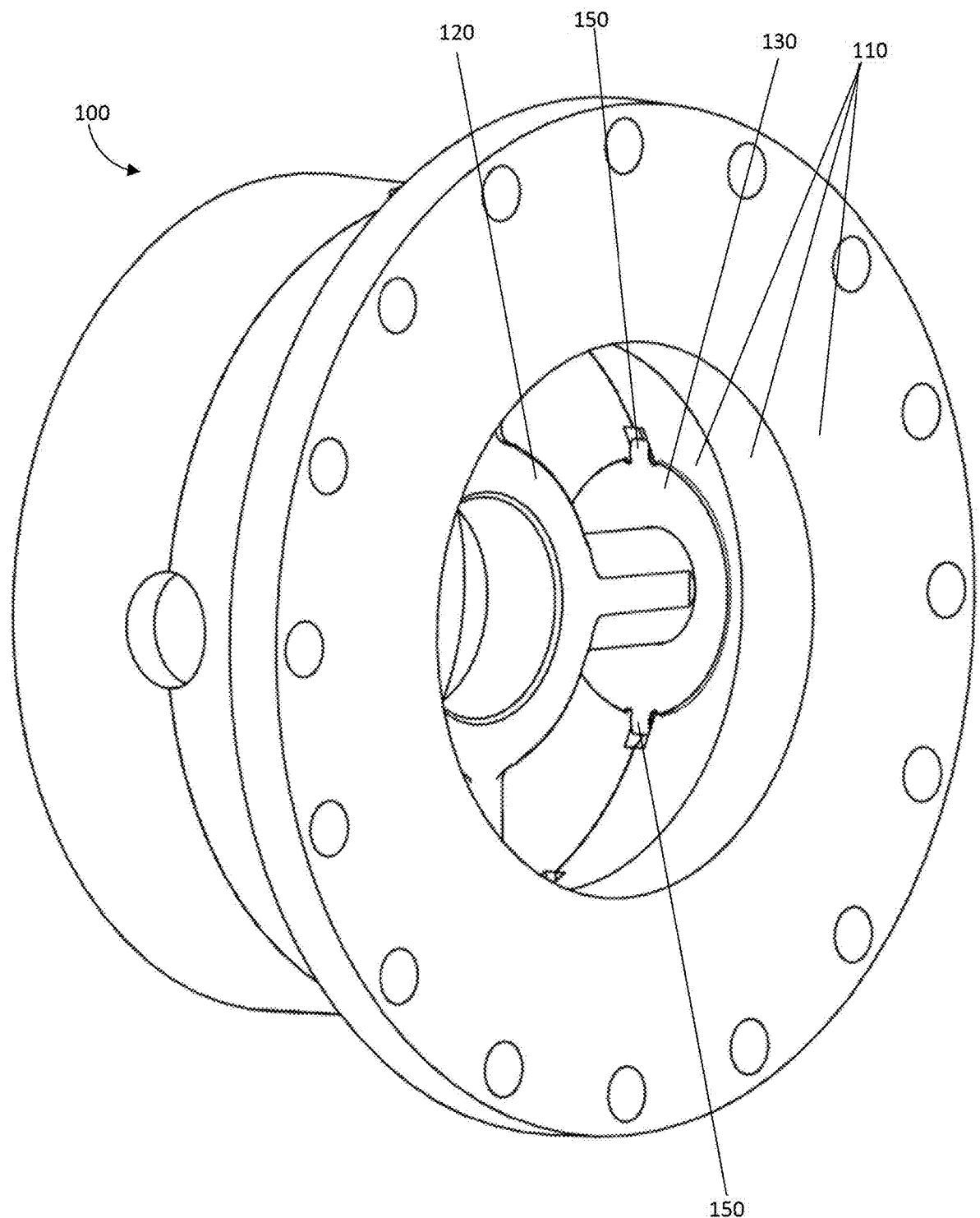
FIG. 9 is a perspective view of a conventional thrust washer in a conventional differential housing with the gears hidden.

For contrast, FIG. 9 shows a perspective cross-sectional view of a conventional thrust washer 130 in a conventional differential 100, in which the spider gears and side gears are removed. In this case, the conventional thrust washer 130 is engaged with a spider 120 and has locking tabs 150 that engage with a housing 110.

Figure 10:
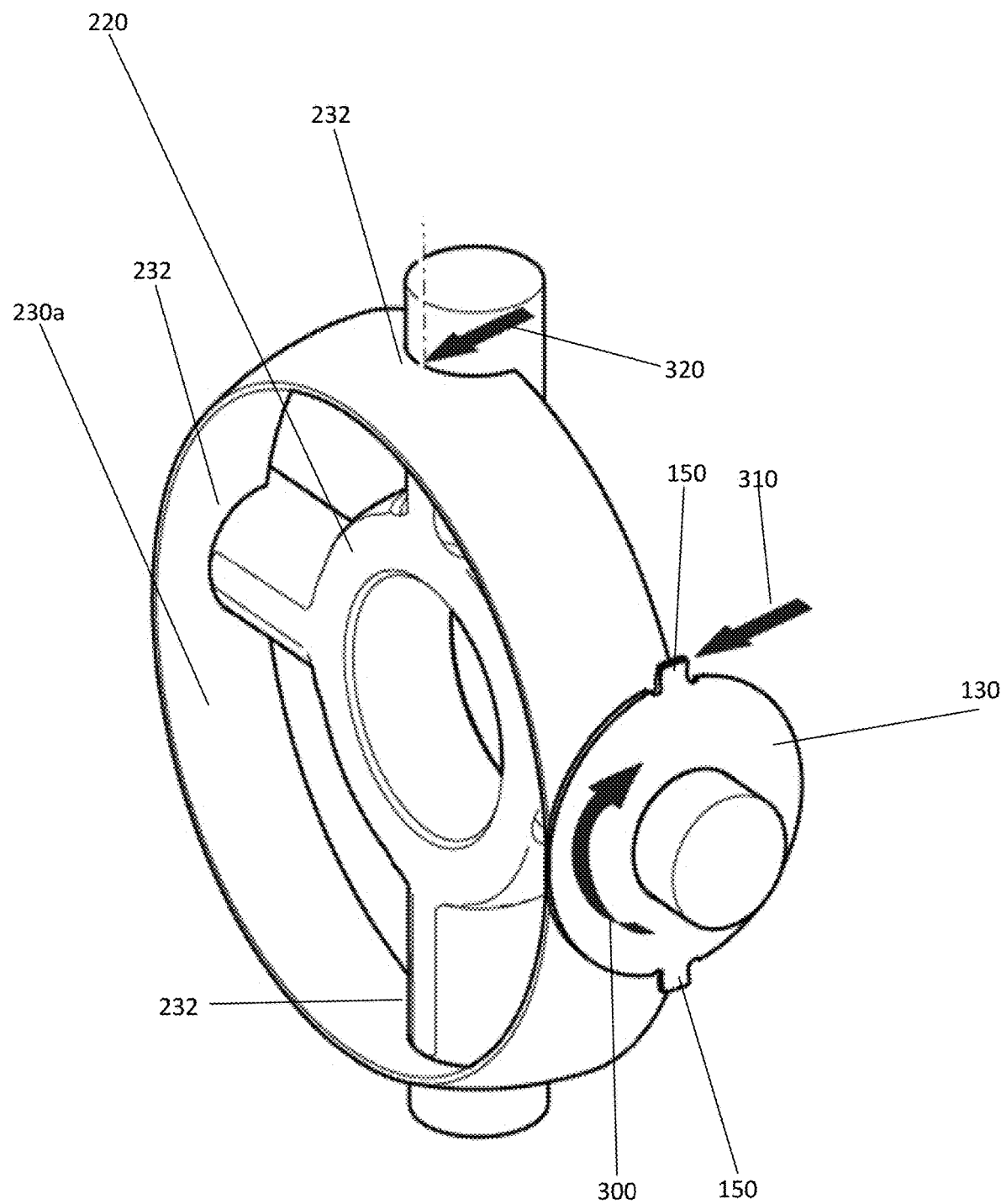
FIG. 10 is a perspective view illustrating a comparison between a portion of a thrust washer according to an embodiment herein with a conventional thrust washer such as that of FIG. 9.

FIG. 10 is a perspective view showing both a conventional washer 130 and a first portion of a thrust washer 230a according to an embodiment herein mounted on a spider 220 to illustrate forces involved in the operation of the differential 230. It will be understood that this arrangement will not ordinarily be done in practice. The first portion of the thrust washer 230a includes a plurality of indentations 232 engaging the arms of the spider. The conventional thrust washer 130 includes two tabs 150 on an outer diameter of the conventional thrust washer 130 to engage a housing of a differential.

FIG. 10 shows a torque 300 applied to either the first portion of the thrust washer 230a or the conventional thrust washer 130 due to friction and/or rotation of the spider gear(s). If the torque 300 were unopposed, rotation of the first portion of the thrust washer 230a or the conventional thrust washer 130 would result, causing wear on the housing of the differential.

In the case of the conventional thrust washer 130, a first reaction force 310 prevents the conventional thrust washer 130 from rotating. In this case, the conventional thrust washer 130 reacts to the torque 300 by applying a force against the housing of the differential via the two tabs 150 while the tabs 150 act as a cantilevered beam and are subjected to relatively high bending and contact stresses.

In the case of the first portion of the thrust washer 230a, a second reaction force 320 prevents the first portion of the thrust washer 230a from rotating. In the present embodiment, the first portion of the thrust washer 230a is a ring/cylinder, and therefore the thrust washer is similar to a simply supported beam that is constrained on both ends when force is applied. In this case, the thrust washer reacts to the torque 300 by applying a force against adjacent arms of the spider which is opposed by the second reaction force 320. Further, the second reaction force 320 is located at a post of the spider adjacent to the given spider gear which is the furthest position relative to the centre of rotation of the spider gear, which minimizes the reaction force 320. The torque 300 may also be prevented from causing rotation of the first portion of the thrust washer 230a by a reaction force arising between the housing of the differential and the first portion of the thrust washer 230a and/or the second portion 230b of the thrust washer.

Due to the large moment arm between the axis of rotation of the first portion of the thrust washer 230a and the location of the second reaction force 320, the force on the first portion of the thrust washer 230a is less than the force on the conventional thrust washer 130. FIG. 10 also illustrates that the thrust washer described herein is supported at multiple points as opposed to limited support points for the conventional thrust washer tab 150 (like a cantilevered beam). Alternative conventional thrust washers, such as those described herein, employing textured surfaces to reduce rotation of the conventional thrust washer may reduce the magnitude of the reaction force 310 by spreading the reaction force across the face of the conventional thrust washer 310, however in this case the conventional thrust washer 310 is typically capable of rotation which may cause increased wear on the housing of the differential.

Figure 11A:
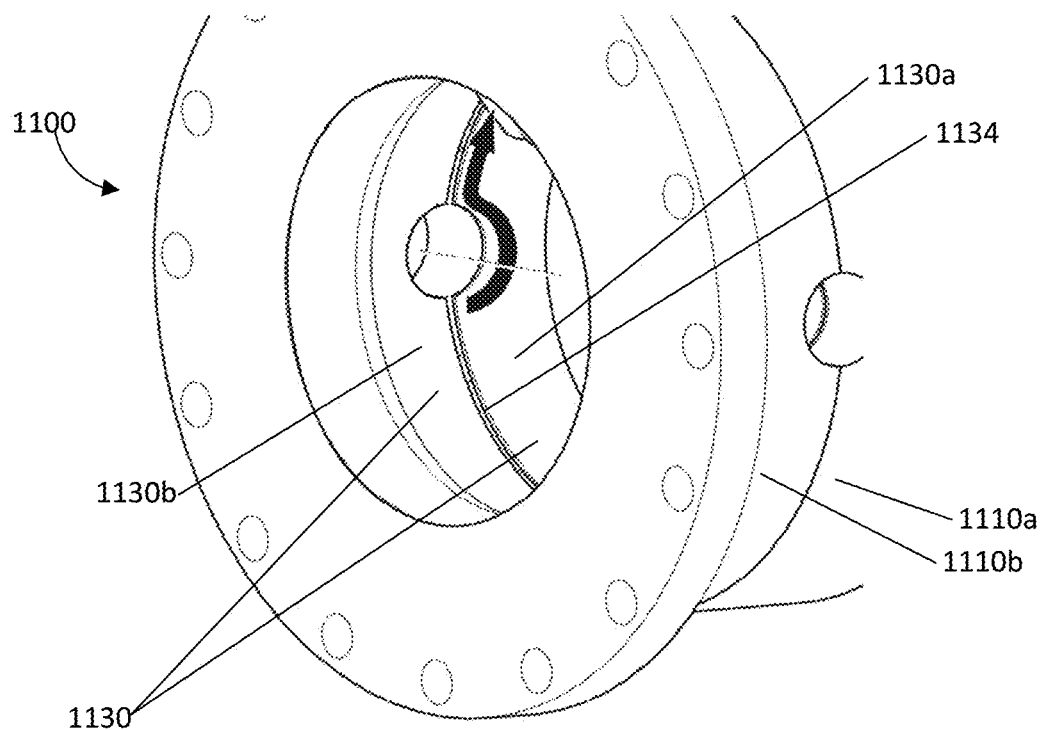
FIG. 11A is a perspective view a thrust washer according to an embodiment herein when positioned in a differential housing.
Figure 11B:
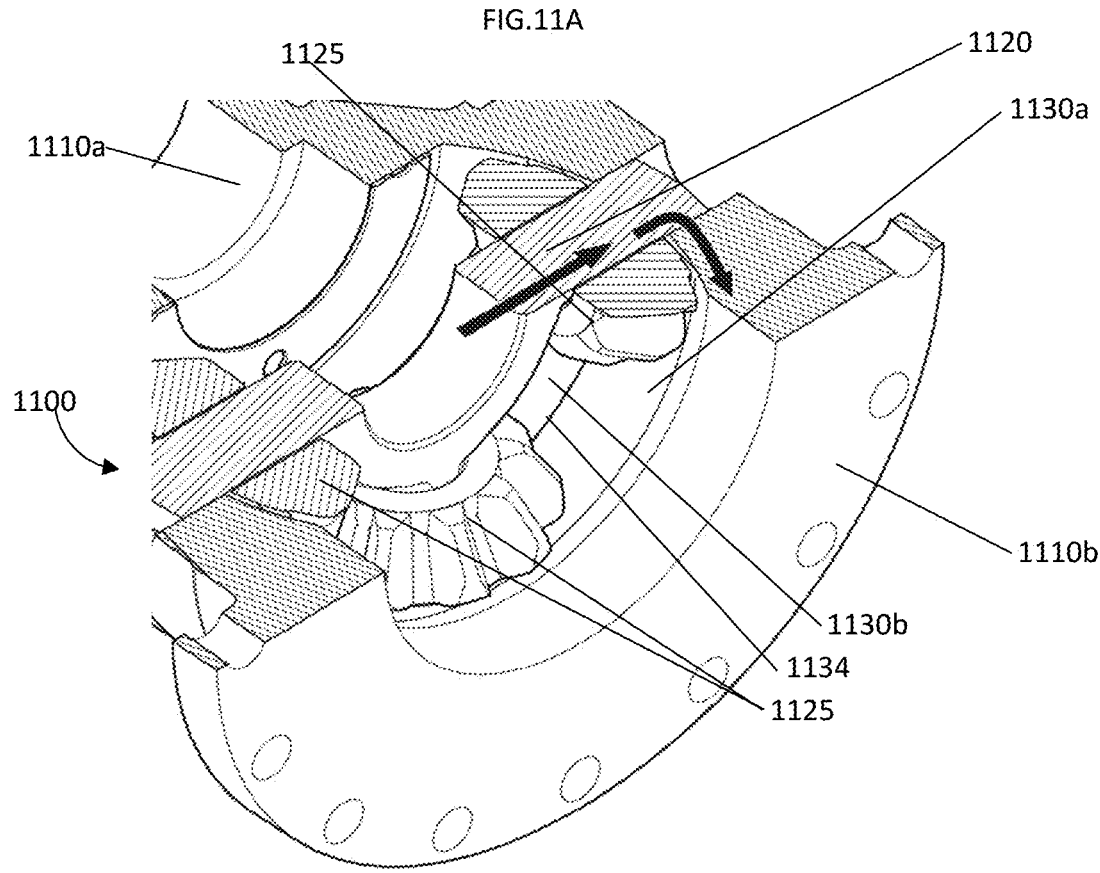
FIG. 11B illustrates the flow of oil within a differential housing according to the embodiment of FIG. 11A.

FIGS. 11A and 11B show another embodiment of a thrust washer 1130 mounted in a differential 1100. Differential 1100 includes a housing 1110, a spider 1120, spider gears 1125. The housing 1110 includes first housing portion 1110a and second housing portion 1110b, which may be combined to form housing 1110. FIG. 11A is a perspective view of the thrust washer 1130 mounted in the housing 1110 of the differential 1100, however spider 1120 and the spider gears 1125 have been omitted from FIG. 11A for clarity. Differential 1100 may include side gears. Thrust washer 1130 includes a first portion of the thrust washer 1130a and a second portion of the thrust washer 1130b. Thrust washer 1130 is similar in some ways to thrust washer 230. The thrust washer 1130 is configured to provide a gap 1134 between the first portion of the thrust washer 1130a and the second portion of the thrust washer 1130b to allow debris (caused by, for example, wear on the spider gears or other parts) to be removed from the sliding surface. In particular, the gap 1134 can provide a channel for debris/contaminants to be removed.

A typical flow path for oil in the housing is shown in FIG. 11B. The oil tends to run up the flats on the spider inside of the spider gear. During rotation, any debris that is generated flows toward the thrust washer 1130 due to centrifugal force. The oil will then pass over the gap 1134 allowing a pathway for debris to be removed from the area between the spider gears and the thrust washer. The removal of debris is intended to further reduce wear on the thrust washer and the housing.

Figure 12:
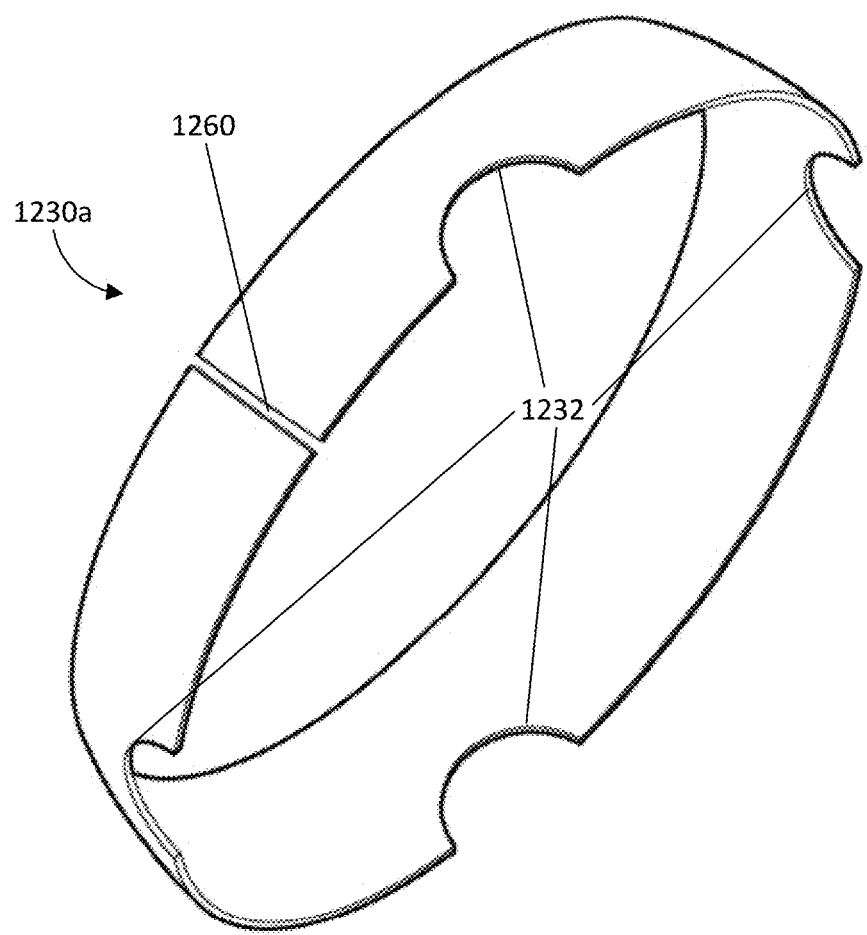
FIG. 12 illustrates a thrust washer according to an embodiment herein.

FIG. 12 shows a further embodiment of a portion of a thrust washer 1230a. Two portions of a thrust washer 1230a may be combined to form a thrust washer similar to the description above. The portion of the thrust washer 1230a has an annular shape and includes a plurality of indentations 1232 and a gap 1260. The indentations 1232 are of a size and shape to allow the portion of a thrust washer 1230a to engage with a spider to cover spider gears of a differential when the portion of the thrust washer 1230a is assembled as a part of a differential. The gap 1260 allows deformation of the portion of a thrust washer 1230a to allow a shape of the portion of a thrust washer 1230a to match a shape of a housing of a differential and is intended to reduce hoop stress due to manufacturing tolerances in the portion of a thrust washer 1230a and/or a housing of a differential containing the portion of the thrust washer 1230a. In this case, if there is a mismatch between an outer diameter of the thrust washer and an inner diameter of the housing, the gap 1260 may expand or collapse such that the functionality of the portion of a thrust washer 1230a would be at least somewhat similar to that of a continuous ring/cylinder thrust washer, for example thrust washer 230.

Figure 13:
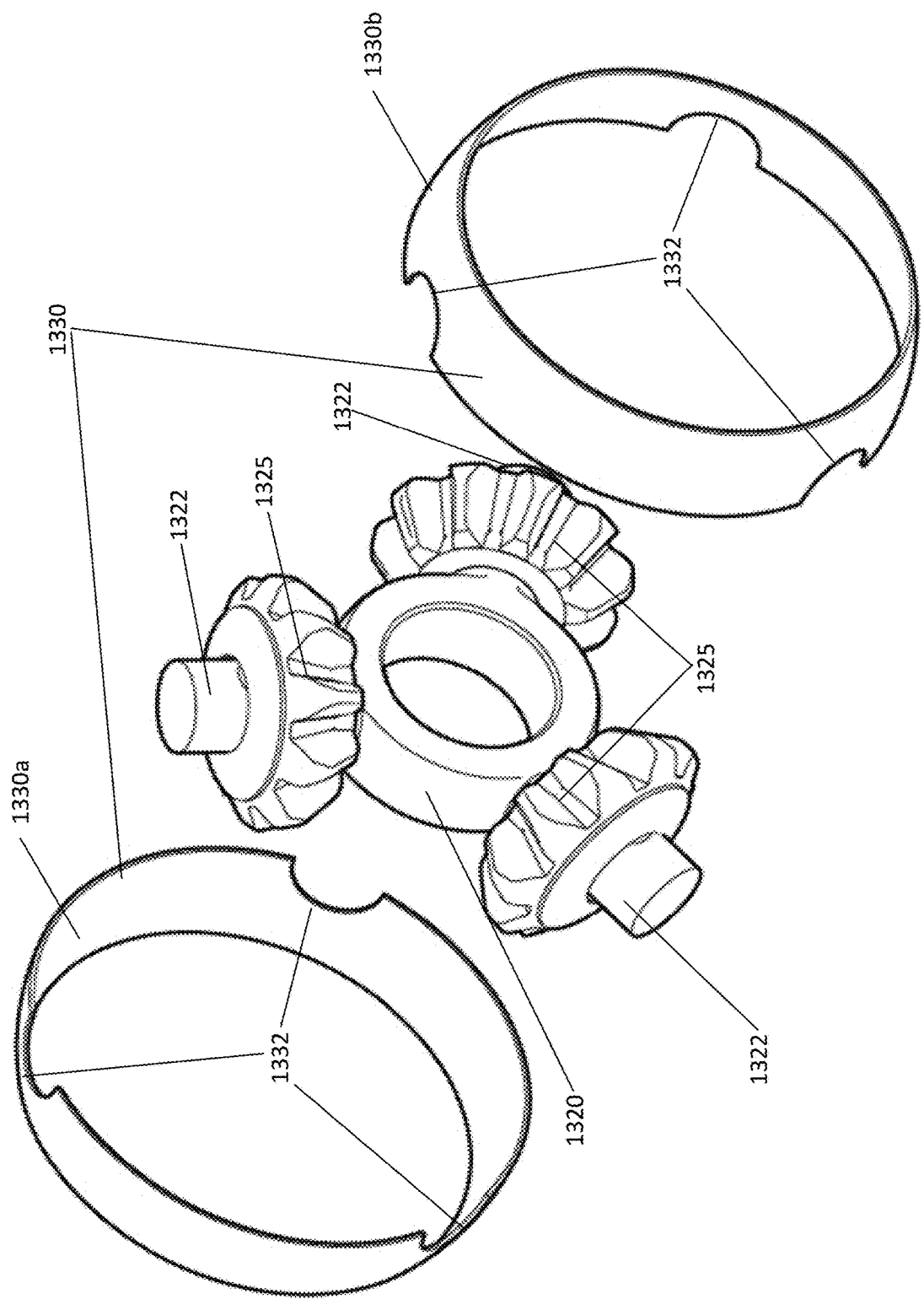
FIG. 13 illustrates a thrust washer according to another embodiment herein.

Although the illustrated embodiments generally relate to a spider having 4 stub shafts, one of skill in the art will understand that the spider may have another number of stub shafts such as 2, 3, 4 or more. The embodiments of a thrust washer described herein can be used to withstand thrust from a variety of spider gear systems. An example is shown in FIG. 13, which illustrates a thrust washer 1330 configured for a spider 1320 having three arms 1322 and a differential having three spider gears 1325. In this embodiment, each half of the thrust washer (1330a and 1330b) has three indentations 1332 that mesh to enclose the three arms of the spider 1320 (in other words, forming three connectors/apertures to connect with the spider), while maintaining their ring/cylindrical shape.

Figure 14:
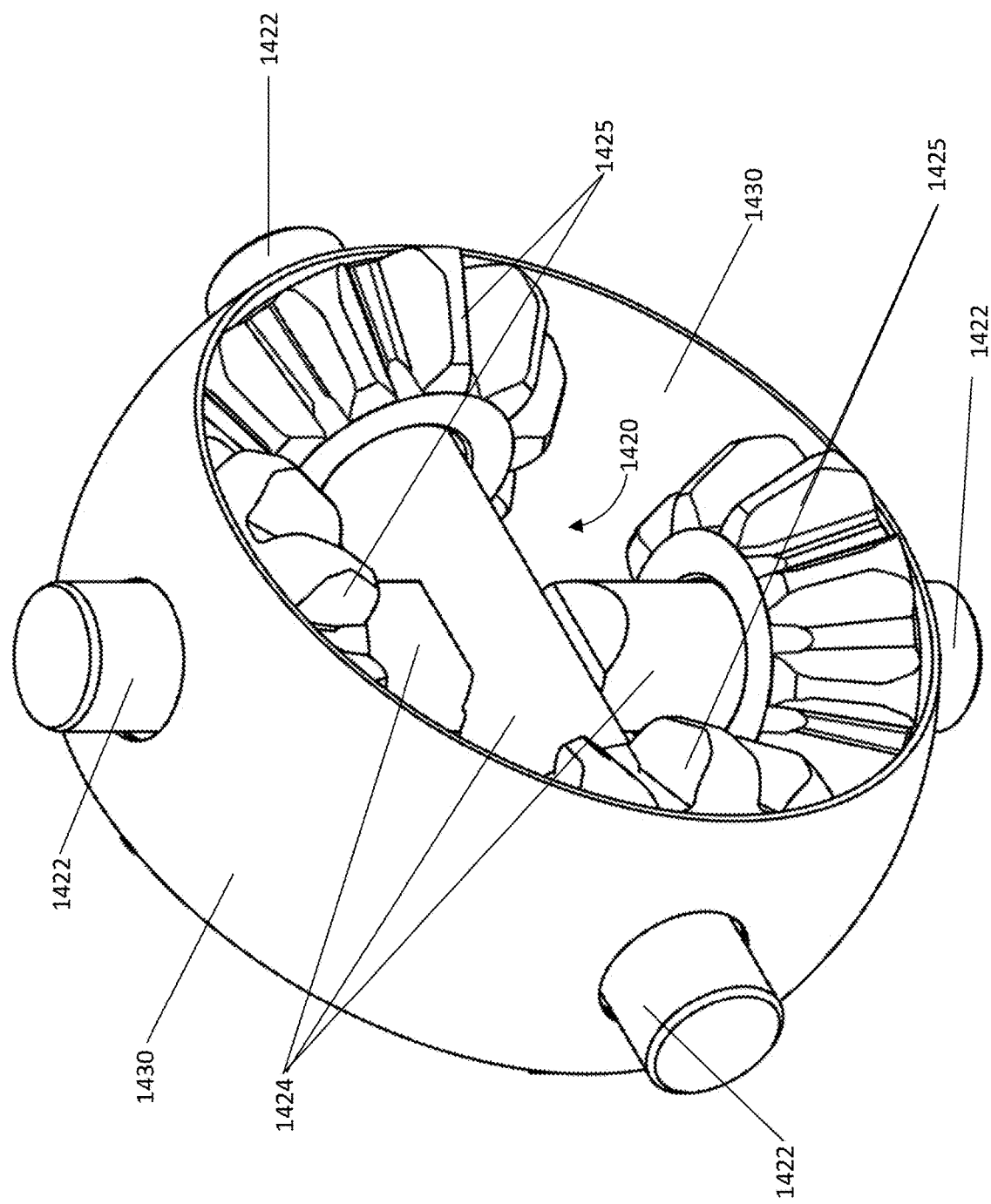
FIG. 14 illustrates a thrust washer according to another embodiment herein, combined with a spider and spider gears.
Figure 15:
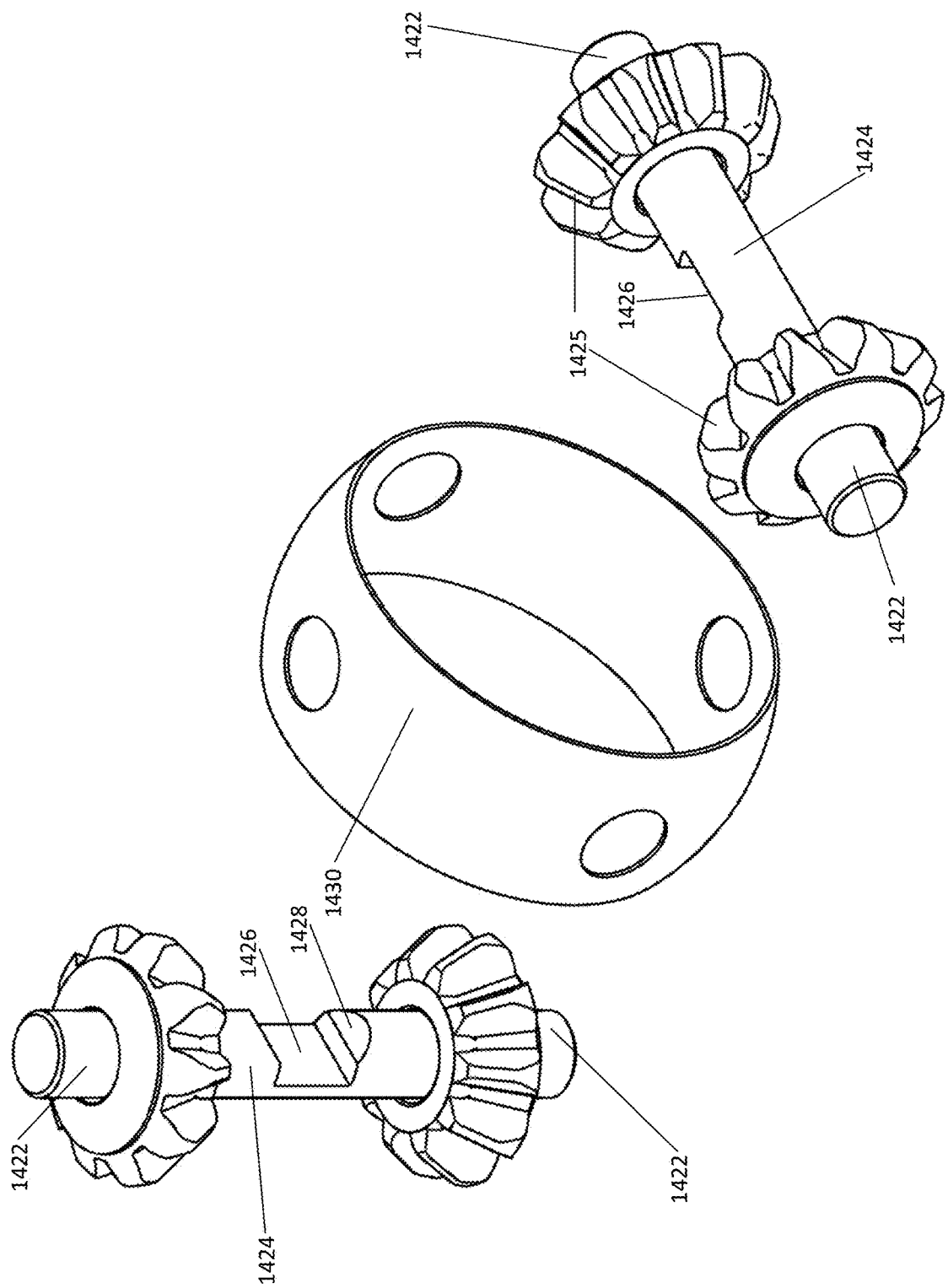
FIG. 15 is a perspective exploded view of a thrust washer such as that in FIG. 14.

FIG. 14 illustrates a thrust washer 1430 according to another embodiment herein, when combined with a spider and spider gears. FIG. 15 is a perspective exploded view of FIG. 14. The thrust washer 1430 is mounted on a spider 1420 comprising two spider portions 1424. Spider gears 1425 are also mounted on the spider and are generally covered by the thrust washer 1430 to provide protection to the housing 210. Notably, in this embodiment, thrust washer 1430 is a circular ring that includes four apertures for receiving spider arms of the spider portions 1424, as an engagement mechanism. In this way, the thrust washer 1430 will be supported/held in position with respect to the spider 1420. Different from some embodiments described herein, the thrust washer 1430 is not made up of two or more portions.

Spider 1420 may be formed by assembling the two spider portions 1424. Each spider portion 1424 includes a groove 1426. Each groove 1426 is configured to allow a first groove 1426 of a first spider portion 1424 to interface with a second groove 1426 from a second spider portion 1424 to form the spider 1420. Each groove 1426 includes a notch 1428 to allow the first spider portion 1424 and the second spider portion 1424 to slide past one another during assembly of the spider 1420. The spider 1420 may be assembled with the spider gears 1425 generally enclosed by the thrust washer 1430. The spider 1420 may be assembled as part of a method of assembling a differential.

A person having ordinary skill in the art, with the benefit of this disclosure, will appreciate that, in alternative embodiments, a thrust washer may be a single portion that includes a slit, gap, joint, hinge, or the like as a part of the engagement mechanism or of the thrust washer itself to allow reversible movement of at least a portion of the thrust washer to allow assembly of the thrust washer together with the spider and spider gears. While in some embodiments of the present disclosure the thrust washer comprises two portions that are configured to meet along a common circumferential surface, in alternative embodiments the thrust washer may include portions that are of unequal size, that are configured to mate together in alternative arrangements (e.g. overlapping segments), and may include alternative engagement mechanisms, such as apertures/indentations of unequal size and/or shape.

A further intended advantage of the thrust washers of the present disclosure is that a thrust washer engages the spider arms at multiple locations and covers all spider gears rather than providing a plurality of conventional thrust washers.

In the preceding description, for purposes of explanation, numerous details are set forth in order to provide a thorough understanding of the example embodiments. However, it will be apparent to one skilled in the art that these specific details may not be required. In other instances, well-known structures may be shown in block diagram form in order not to obscure the understanding. It will be further understood that, where appropriate, aspects from one embodiment may be used in other embodiments.

What has been described is merely illustrative of the application of some embodiments. It will be understood that elements of each embodiment may be combined with elements of other embodiments and that not every element in an embodiment is required. For example, each embodiment may include more or fewer elements as would be understood by one of skill in the art on reading this description. Further, other systems, apparatus and methods can be implemented by those skilled in the art without departing from the spirit and scope of the invention, which is defined by the following claims.

We claim:

1. A thrust washer for a differential having a housing, a spider, and one or more spider gears, the thrust washer comprising:
   a thrust washer body comprising an annular shape having a width configured to approximately match a width of the one or more spider gears and conform to a shape of the spider gears and further configured to engage with the spider to approximately prevent the thrust washer from rotating relative to the housing when the thrust washer is installed in the differential,
   wherein the body is configured to have a slope along the width configured to conform with an inner diameter of the housing such that the slope engages with the housing to reduce separation of a first portion and a second portion of the thrust washer body.

2. The thrust washer of claim 1, wherein the spider comprises at least one spider arm and wherein the thrust washer comprises at least one engagement mechanism having a size and a shape to engage with an outer diameter of the at least one spider arm to engage the thrust washer with the spider.

3. The thrust washer of claim 2, wherein the at least one spider arm comprises four arms, the at least one engagement mechanism comprises four apertures, and each of the four apertures are positioned and oriented to engage a respective one of the four arms when the thrust washer is installed in the differential.

4. The thrust washer of claim 1, wherein the first portion and the second portion are configured to assemble around the spider and the spider gears.

5. The thrust washer of claim 4, wherein the first portion and the second portion are configured to provide a gap between the first portion and the second portion when assembled to allow the flow of debris or the like.

6. The thrust washer of claim 1, wherein the thrust washer has a continuous ring shape.

7. The thrust washer of claim 1, wherein the thrust washer comprises a gap across the width of the thrust washer.

8. A differential comprising:
   a housing;
   a spider and one or more spider gears;
   at least two side gears positioned and oriented to engage the one or more spider gears within the housing; and
   a thrust washer positioned between the housing and the at least one spider gear, the thrust washer comprising:
      a body comprising an annular shape having a width configured to approximately match with a width of the one or more spider gears and further configured to engage with the spider to prevent the thrust washer from rotating relative to the housing when the thrust washer is installed in the differential,
      wherein the body is configured to have a slope along the width configured to conform with an inner diameter of the housing and the slope engages with the housing to reduce separation of a first portion and a second portion of the body.

9. The differential of claim 8, wherein the spider comprises at least one spider arm and wherein the thrust washer comprises at least one engagement mechanism having a size and a shape to engage with an outer diameter of the at least one spider arm to engage the thrust, washer with the spider.

10. The differential of claim 9, wherein the at least one spider arm comprises four arms, the at least one engagement mechanism comprises four apertures, and wherein each of the four apertures are positioned and oriented to engage a respective one of the four arms when the thrust washer is installed in the differential.

11. The differential of claim 8, wherein the slope along the width also conforms to a shape of the spider gears.

12. The differential of claim 8, wherein the first portion and the second portion are configured to assemble around the spider and the spider gears.

13. The differential of claim 12, wherein the first portion and the second portion are configured to provide a gap between the first portion and the second portion to allow the flow of debris or the like.

14. The differential of claim 8, wherein the thrust washer has a continuous ring shape.

15. The differential of claim 8, wherein the thrust washer comprises a gap across the width of the thrust washer.

16. The differential of claim 8, wherein the thrust washer comprises a single contiguous body.

17. A thrust washer for a differential having a housing, a spider, and one or more spider gears, the thrust washer comprising:
   a thrust washer body comprising an annular shape having a width configured to approximately match a width of the one or more spider gears, the thrust washer body comprising:

a first portion and a second portion, wherein each of the first and second portions are configured to engage with the spider to prevent the thrust washer from rotating relative to the housing when the thrust washer is installed in the differential and are also configured such that a slope along the width conforms with an inner diameter of the housing and engages with the housing to reduce separation of the first portion and the second portion.

* * * * *